United States Patent
Amadon et al.

(10) Patent No.: US 10,669,894 B2
(45) Date of Patent: Jun. 2, 2020

(54) ANNULAR RETENTION STRAP

(71) Applicant: UNITED TECHNOLOGIES CORPORATION, Farmington, CT (US)

(72) Inventors: Colin G Amadon, Kennebunk, ME (US); Thomas Freeman, Kennebunk, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 26 days.

(21) Appl. No.: 15/881,069

(22) Filed: Jan. 26, 2018

(65) Prior Publication Data
US 2019/0234241 A1 Aug. 1, 2019

(51) Int. Cl.
*F01D 25/24* (2006.01)
*F01D 9/04* (2006.01)

(52) U.S. Cl.
CPC .............. *F01D 25/24* (2013.01); *F01D 9/04* (2013.01); *F05D 2220/323* (2013.01); *F05D 2230/60* (2013.01); *F05D 2240/14* (2013.01); *F05D 2250/36* (2013.01); *F05D 2260/30* (2013.01); *F05D 2300/431* (2013.01); *F05D 2300/50211* (2013.01); *F05D 2300/603* (2013.01); *F05D 2300/6012* (2013.01)

(58) Field of Classification Search
CPC ........ F01D 25/24; F01D 25/14; F01D 21/045; F05D 2220/323; F05D 2230/60
USPC ................................................. 415/200, 197
See application file for complete search history.

(56) References Cited

U.S. PATENT DOCUMENTS

| | | | | |
|---|---|---|---|---|
| 4,149,824 | A * | 4/1979 | Adamson | F01D 21/006 415/197 |
| 4,349,313 | A * | 9/1982 | Munroe | F01D 11/125 415/173.4 |
| 4,534,698 | A * | 8/1985 | Tomich | F01D 21/045 415/121.2 |
| 5,380,155 | A | 1/1995 | Varsik et al. | |
| 6,213,720 | B1 * | 4/2001 | Farmer | F01D 5/021 416/198 A |

(Continued)

FOREIGN PATENT DOCUMENTS

| | | |
|---|---|---|
| EP | 2075415 | 7/2009 |
| GB | 938123 | 10/1963 |

OTHER PUBLICATIONS

European Patent Office, European Search Report dated May 27, 2019 in Application No. 18206118.4.

*Primary Examiner* — Igor Kershteyn
*Assistant Examiner* — Jason G Davis
(74) *Attorney, Agent, or Firm* — Snell & Wilmer L.L.P.

(57) ABSTRACT

A gas turbine engine includes an annular structure disposed around an engine central longitudinal axis of the gas turbine engine. The annular structure defines an annular channel and comprises a first density, according to various embodiments. The gas turbine engine may further include a weight-saving filler disposed within the annular channel. The weight-saving filler may have a second density that is less than the first density. The gas turbine engine may further include an annular retention strap disposed around the engine central longitudinal axis of the gas turbine engine. The annular retention strap is at least partially embedded in the weight-saving filler, according to various embodiments.

20 Claims, 5 Drawing Sheets

(56) References Cited

U.S. PATENT DOCUMENTS

| | | | |
|---|---|---|---|
| 6,619,913 B2* | 9/2003 | Czachor | F01D 21/045 415/119 |
| 8,061,967 B2* | 11/2011 | Marlin | F01D 21/045 415/9 |
| 8,696,311 B2 | 4/2014 | Eleftheriou et al. | |
| 8,998,574 B2 | 4/2015 | Menheere et al. | |
| 9,506,361 B2 | 11/2016 | Fielding et al. | |
| 2014/0147262 A1 | 5/2014 | Grelin | |
| 2015/0308277 A1 | 10/2015 | Verhelst | |
| 2016/0024940 A1 | 1/2016 | Wilber | |
| 2016/0102571 A1* | 4/2016 | Cortequisse | F01D 1/20 415/1 |
| 2017/0305117 A1* | 10/2017 | Fuerst | B32B 17/066 |

* cited by examiner

ANNULAR RETENTION STRAP

GOVERNMENT LICENSE RIGHTS

This disclosure was made with government support under contract number FA8626-16-C-2139 awarded by the United States Air Force. The government has certain rights in the disclosure.

FIELD

The present disclosure relates to gas turbine engines, and more specifically to an annular retention strap for retaining a weight-saving filler.

BACKGROUND

A gas turbine engine typically includes a fan section, a compressor section, a combustor section, and a turbine section. A fan section may drive air along a bypass flowpath while a compressor section may drive air along a core flowpath. Because weight is an important consideration in the manufacture and operation of gas turbine engines and because many of the components of a gas turbine engine are made from metallic materials, certain portions of gas turbine engines that have historically been made of metal are being replaced by less dense materials. While these less dense materials are weight-saving, these materials may be prone to disbond, delaminate, or otherwise structurally deteriorate in response to experiencing the high operating temperatures of a gas turbine engine. The deteriorating material may liberate and cause damage or may otherwise adversely affect the operation of the gas turbine engine.

SUMMARY

In various embodiments, the present disclosure provides a gas turbine engine that includes an annular structure disposed around an engine central longitudinal axis of the gas turbine engine. The annular structure defines an annular channel and comprises a first density, according to various embodiments. The gas turbine engine may further include a weight-saving filler disposed within the annular channel. The weight-saving filler may have a second density that is less than the first density. The gas turbine engine may further include an annular retention strap disposed around the engine central longitudinal axis of the gas turbine engine. The annular retention strap is at least partially embedded in the weight-saving filler, according to various embodiments.

In various embodiments, the annular retention strap is a full, integral hoop. In various embodiments, the annular retention strap is completely surrounded by the weight-saving filler. In various embodiments, the annular structure has a first coefficient of thermal expansion, the annular retention strap has a second coefficient of thermal expansion, and the first coefficient of thermal expansion is substantially equal to the second coefficient of thermal expansion. The annular structure and the annular retention strap may be made from a same material. In various embodiments, the annular retention strap is made from a woven composite material.

According to various embodiments, the weight-saving filler is a rubber material. The annular channel may face radially outward and a radially outward surface of the weight-saving filler may be configured to be exposed to airflow. In various embodiments, the annular structure is a flow splitter between a core flowpath and a bypass flowpath. The annular structure may be a stator shroud or case.

Also disclosed herein, according to various embodiments, is a method of assembling a gas turbine engine. The method may include positioning an annular retention strap in an annular channel defined by an annular structure, wherein the annular retention strap and the annular channel are disposed about an engine central longitudinal axis of the gas turbine engine. The method may further include positioning a weight-saving filler into the annular channel such that the annular retention strap is at least partially embedded in the weight-saving filler.

In various embodiments, the method may further include positioning a plurality of preformed weight-saving spacers in the annular channel before the positioning the annular retention strap in the annular channel, wherein the preformed weight-saving spacers facilitate holding the annular retention strap in a desired orientation during the positioning the weight-saving filler into the annular channel. The weight-saving spacers may be circumferentially distributed around the engine central longitudinal axis. The weight-saving spacers and the weight-saving filler are made from the same material, according to various embodiments.

Positioning the weight-saving filler may include pouring a liquid precursor into the annular channel and subsequently allowing the liquid precursor to cure to become the weight-saving filler. In various embodiments, the method further includes forming a radially outward surface of the weight-saving filler using a mold, wherein the radially outward surface of the weight-saving filler is configured to be exposed to airflow. In various embodiments, positioning the annular retention strap in the annular channel defined by the annular structure comprises cooling the annular structure to contract the annular structure to a first diameter and heating the annular retention strap to expand the annular retention strap to a second diameter, wherein the first diameter is smaller than the second diameter. The method may further include allowing the annular structure and the annular retention strap to reach a substantially similar temperature so that the annular structure has a third diameter and the annular retention strap has a fourth diameter, wherein the third diameter is larger than the fourth diameter.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
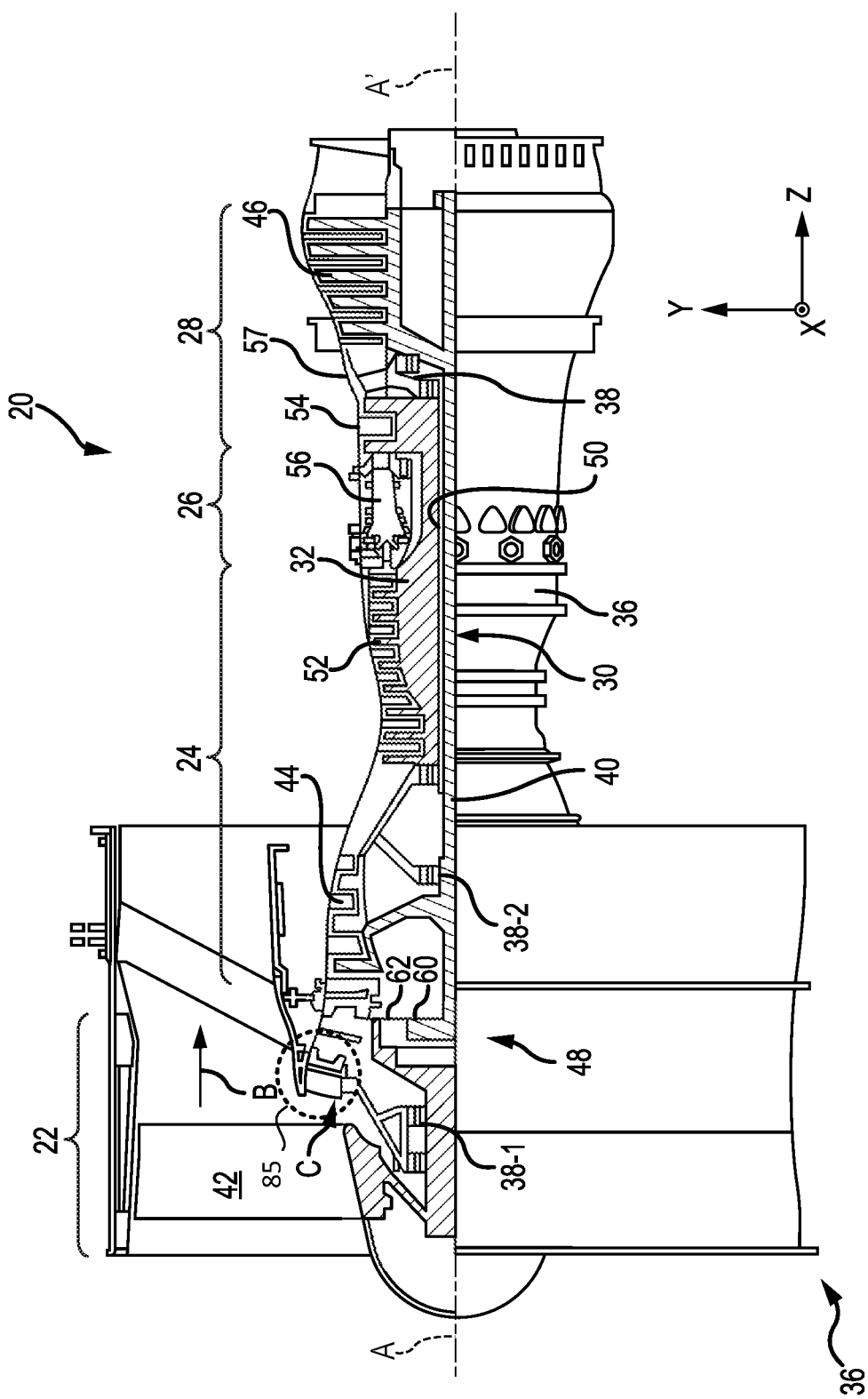
FIG. 1 illustrates a cross-sectional view of a gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. The term "axial," as used herein, refers to a direction along or parallel to the engine central longitudinal axis. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flowpath C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
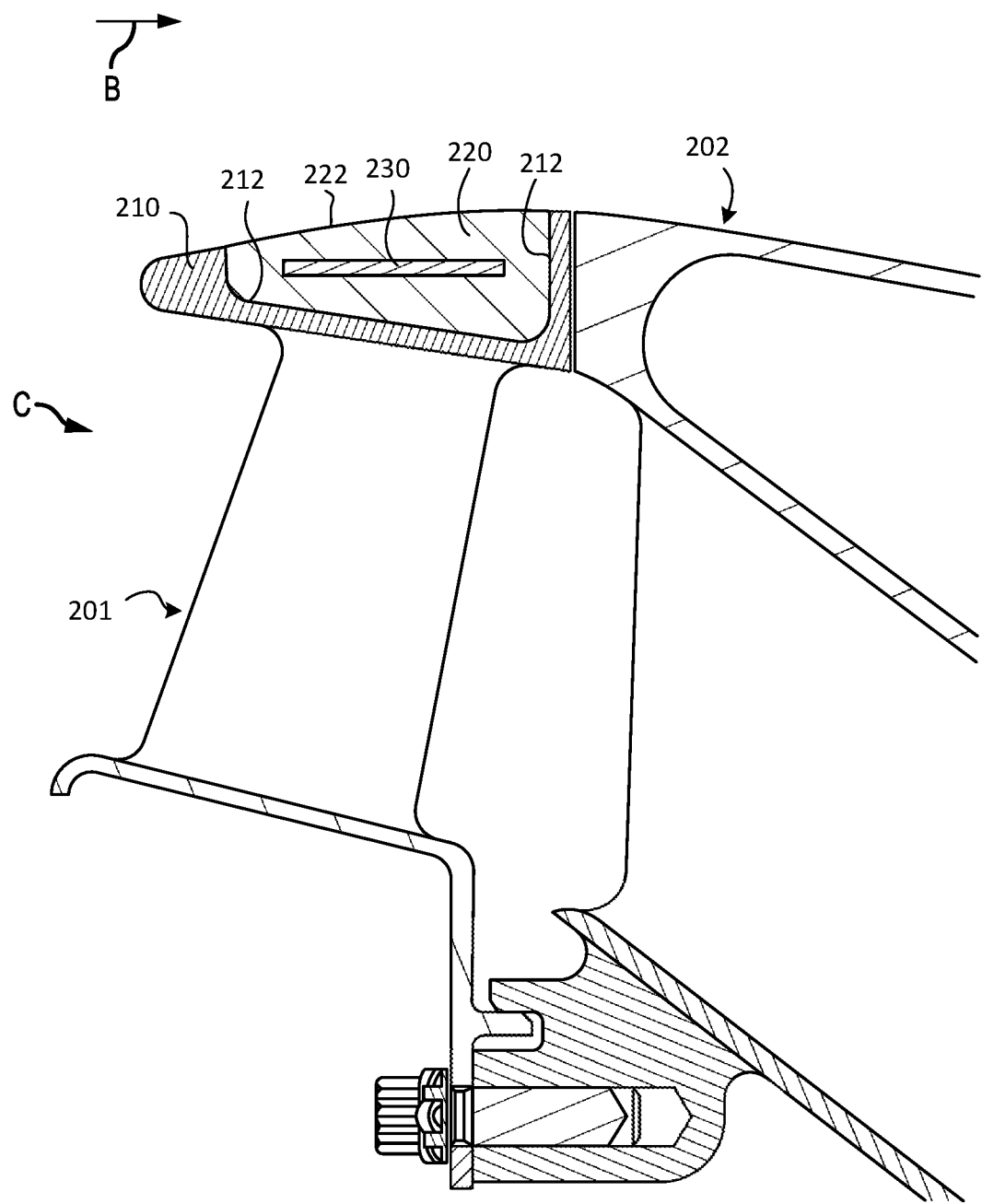
FIG. 2 illustrates a cross-sectional view of an annular retention strap embedded in a weight-saving filler, in accordance with various embodiments.
Figure 3:
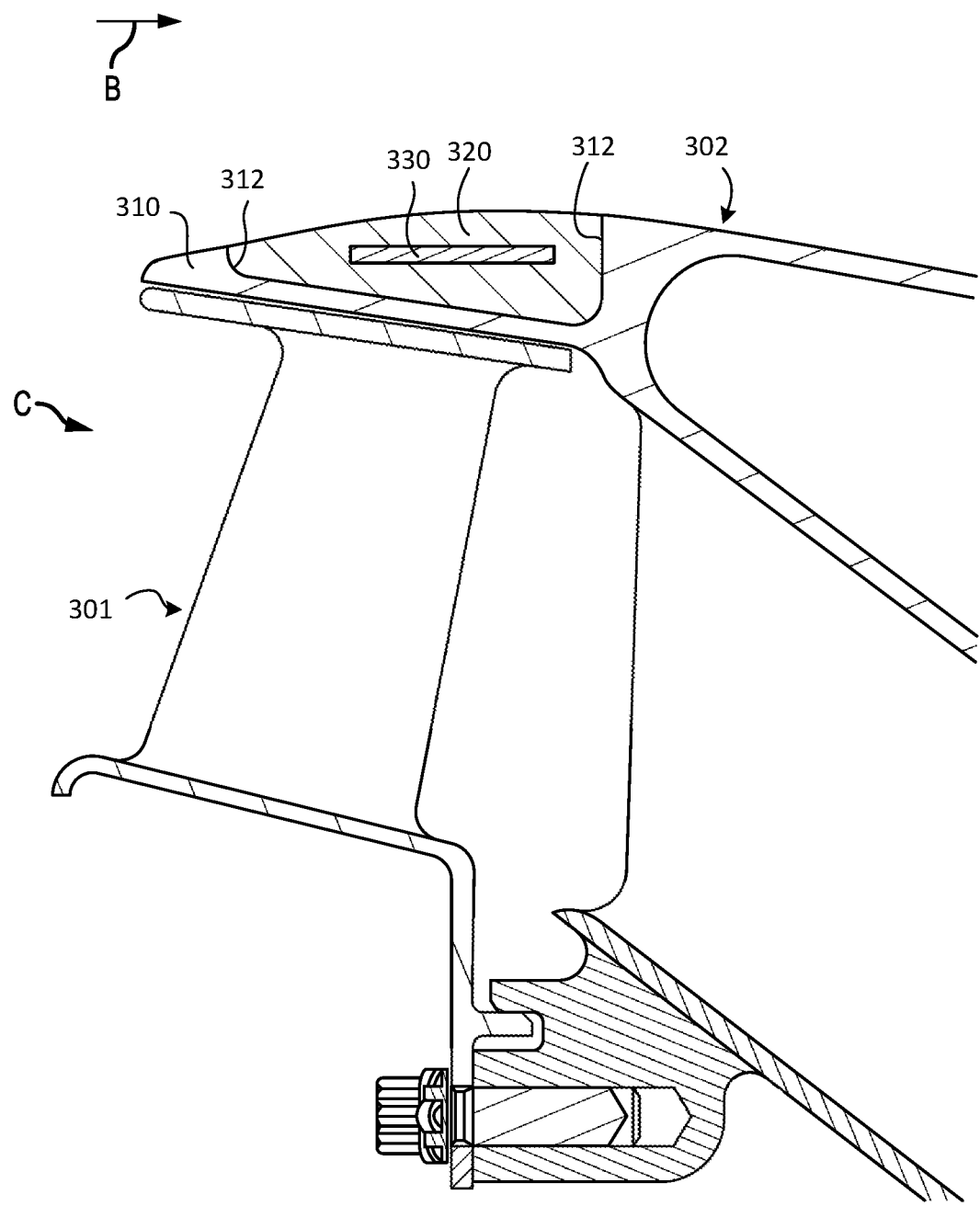
FIG. 3 illustrates a cross-sectional view of an annular retention strap embedded in a weight-saving filler, in accordance with various embodiments.

In various embodiments, and with reference to FIG. 2, an annular structure 210 of a gas turbine engine 20 is provided. The annular structure 210 may be a portion of a stator 201, such as a stator shroud, or the annular structure 310, with momentary reference to FIG. 3, may be a portion of a case. The annular structure, according to various embodiments, is located in the fan section 22 or the compressor section 24 of the gas turbine engine 20. In various embodiments, the annular structure 210 is the flow splitter between core flowpath C and bypass flowpath B, as indicated by area 85 indicated in FIG. 1.

The annular structure 210 is generally disposed around the engine central longitudinal axis A-A' and the annular structure 210 defines an annular channel 212, according to various embodiments. A weight-saving filler 220 may be disposed within the annular channel 212. The weight-saving filler 220 is generally defined herein as a material that has a lower density than the material of the annular structure 210. That is, the annular structure 210 may be made from a first material that has a first density and the weight-saving filler may be made from a second material that has a second density, with the second density being lower than the first density. In various embodiments, the weight-saving filler has a density that is at most 75% of the density of the annular structure 210. For example, the annular structure 210 may be made from a metallic material, such as titanium, a titanium alloy, etc., and the weight-saving filler 220 may be made from a rubber material, a plastic material, etc. In various embodiments, the weight-saving filler 220 has a density of less than about 2.0 grams per cubic centimeter. In various embodiments, the weight-saving filler 220 has a density of less than about 1.5 grams per cubic centimeter. As used in this context only, the term "about" means plus or minus 5% of the indicated value.

In various embodiments, and with continued reference to FIG. 2, an annular retention strap 230 is a rigid retaining ring disposed around the engine central longitudinal axis A-A' and is at least partially embedded in the weight-saving filler 220. The annular retention strap 230 may be a full, integral hoop, or the annular retention strap 230 may comprise a plurality of arcuate segments fastened together (e.g., welded, riveted, bonded together) to cumulatively form the annular hoop/ring. The annular retention strap 230 is generally configured to provide structural reinforcement to the weight-saving filler 220, thereby facilitating retention of the weight-saving filler 220 within the annular channel 212 defined by the annular structure 210, according to various embodiments. That is, the annular retention strap 230 may inhibit liberation of pieces of the weight-saving filler 220 and/or may otherwise mitigate disbonding and delamination of the weight-saving filler 220 from the annular channel 212. In various embodiments, the annular retention strap 230 may also provide a degree of damping, thereby beneficially affecting the vibratory stress response of the annular structure 210 and the surrounding components.

In various embodiments, the annular retention strap 230 is made from a metallic material or a woven composite material, among others. In various embodiments, the coefficients of thermal expansion of the annular retention strap 230 and the annular structure 210 are substantially equal. That is, the annular structure 210 may be made from a first material and may have a first coefficient of thermal expansion and the annular retention strap 230 may be made from a second material and may have a second coefficient of thermal expansion. The first coefficient of thermal expansion may be substantially equal to the second coefficient of thermal expansion. As used in this context only, the term "substantially equal" means the two values are within 10% of each other. Having substantially equal coefficients of thermal expansion may reduce the extent of stress and strain imparted on the weight-saving filler 220 disposed, according to various embodiments, between the annular structure 210 and the annular retention strap 230. In various embodiments, the annular retention strap 230 is completely surrounded by the weight-saving filler 220. For example, weight-saving filler 220 may be disposed radially inward of, radially outward of, axially forward of, and axially aft of the annular retention strap 230. In various embodiments, the first material of the annular structure 210 is the same as the second material of the annular retention strap 230. In various embodiments, the annular retention strap 230 may include weight-reduction holes, apertures, or cutouts.

As mentioned above, the annular structure 210 may be a flow splitter between two flowpaths. Accordingly, in various embodiments the annular channel 212 faces radially outward such that a radially outward surface 222 of the weight-saving filler is exposed to airflow (e.g., airflow in the bypass flowpath B). In various embodiments, and with reference to FIG. 3, the annular structure 310 is a portion of the case 302 instead of being a shroud of the stator 301. The annular structure 310 defines the annular channel 312, the weight-saving filler 320 is disposed within the annular channel 312, and the annular retention strap 330 is at least partially embedded in the weight-saving filler 320.

Figure 4:
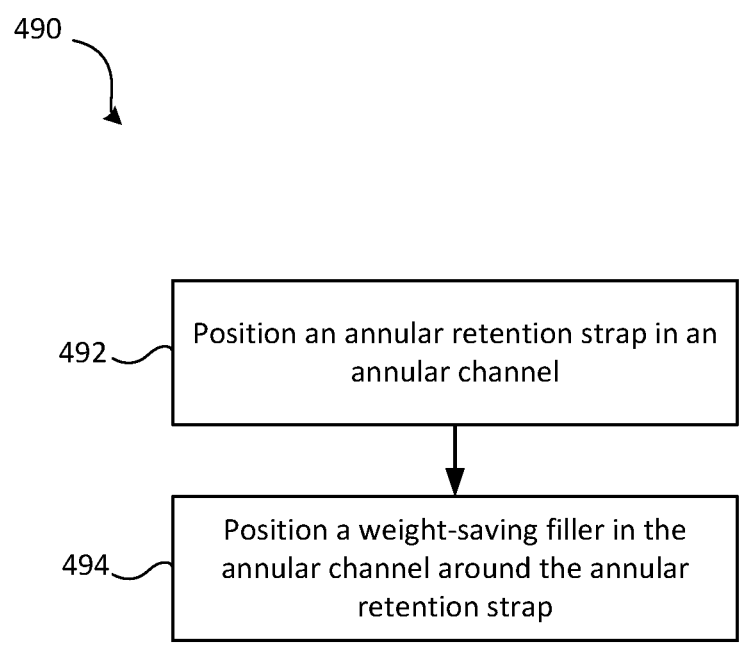
FIG. 4 is a schematic flow chart diagram of a method of assembling a gas turbine engine, in accordance with various embodiments.

In various embodiments, and with reference to FIG. 4, a method 490 of assembling the gas turbine engine 20 is provided. The method 490 may include positioning the annular retention strap 230 in the annular channel 212 at step 492 and positioning the weight-saving filler 220 into the annular channel 212 around the annular retention strap 230 at step 494. That is, the annular retention strap 230 is at least partially embedded in the weight-saving filler 220.

Figure 5A:
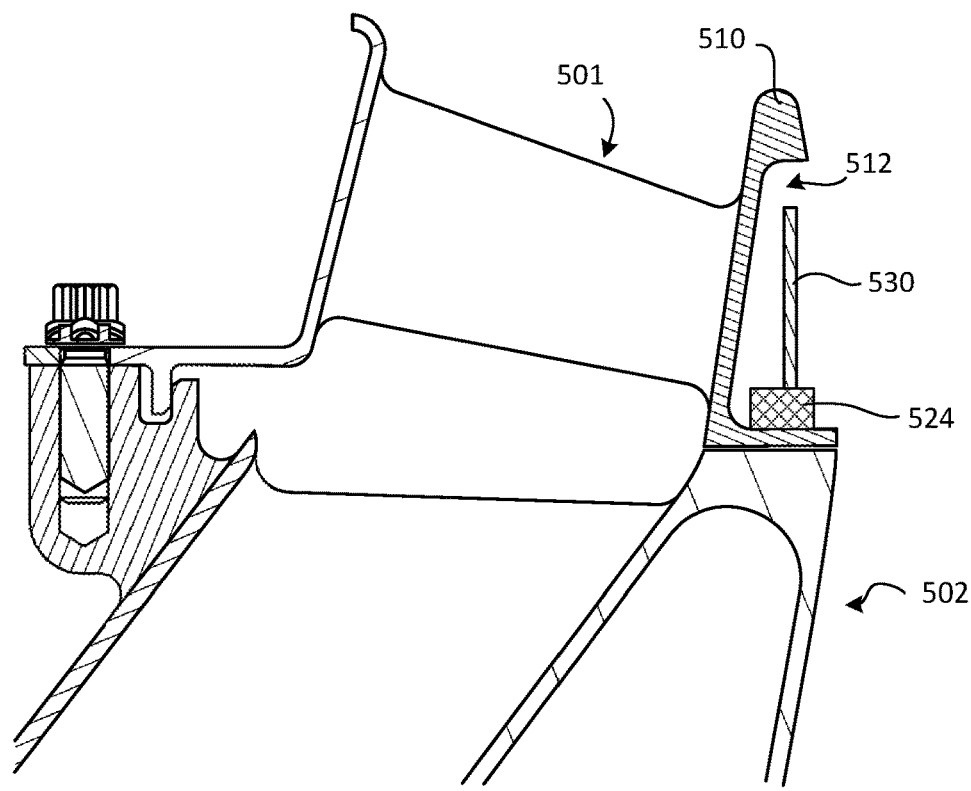
FIG. 5A illustrates a cross-sectional view of a gas turbine engine being assembled, in accordance with various embodiments.
Figure 5B:
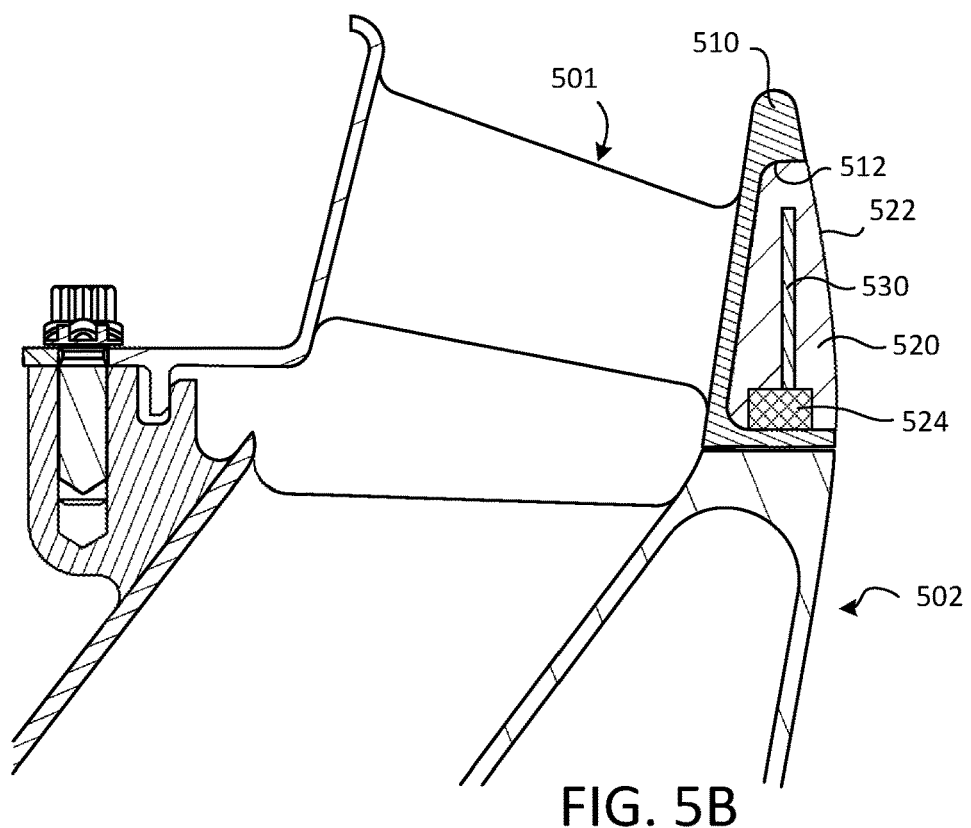
FIG. 5B illustrates a cross-sectional view of a gas turbine engine being assembled, in accordance with various embodiments.

In various embodiments, and with reference to FIGS. 4, 5A, and 5B, the method 490 may further include positioning a plurality of preformed weight-saving spacers 524 in the annular channel 512 before step 492. FIGS. 5A and 5B depict structure similar to that shown in FIG. 2, but with the gas turbine engine rotated 90 degrees. That is, the gas turbine engine 20, at least during these method assembly steps, may be oriented so that the forward direction is facing upwards (towards the top of the page of FIGS. 5A and 5B). Accordingly, the preformed weight-saving spacers 524 may be placed on a radially extending, aft-most wall of the annular channel 512 and may be configured to hold the annular retention strap 530 in a desired orientation during step 494. That is, the weight-saving spacer 524 may be initially placed, and then the annular retention strap 530 may be placed on top of the weight-saving spacer 524. Thus, the weight-saving spacer(s) 524 may suspend the annular retention strap 530 within the annular channel 512 and away from the walls of the annular channel 512, thus allowing the weight-saving filler 520 to be subsequently placed around the annular retention strap 530. The weight-saving spacers 524 may be circumferentially distributed around the engine central longitudinal axis A-A' of the gas turbine engine 20. In various embodiments, the weight-saving spacers 524 are made from the same material as the weight-saving filler 520.

In various embodiments, step 494 may include pouring a liquid precursor into the annular channel 512 and allowing time for the liquid precursor to cure to form the weight-saving filler 520. In various embodiments, the method 490 may further include forming a radially outward surface 522 of the weight-saving filler 520 using a mold. In various embodiments, step 492 of the method 490 includes cooling the annular structure 510 to contract the annular structure 510 to a first diameter and heating the annular retention strap 530 to expand the annular retention strap 530 to a second diameter, wherein the first diameter is smaller than the second diameter. Said differently, the annular structure 510 and the annular retention strap 530 may be so treated in order to create sufficient tolerance between the two components to allow the annular retention strap 530 to fit over the annular structure 510. After allowing the annular structure 510 and the annular retention strap 530 to reach a substantially similar temperature, the annular structure 510 may have expanded back to a third diameter and the annular retention strap may have contracted back to a fourth diameter, wherein the third diameter is larger than the fourth diameter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
an annular structure disposed around an engine central longitudinal axis of the gas turbine engine, wherein the annular structure defines an annular channel and comprises a first density;
a weight-saving filler disposed within the annular channel, wherein the weight-saving filler comprises a second density that is less than the first density; and
an annular retention strap disposed around the engine central longitudinal axis of the gas turbine engine, wherein the annular retention strap is at least partially embedded in the weight-saving filler such that the weight-saving filler is disposed both radially inward of and radially outward of the annular retention strap;
wherein the annular channel faces radially outward.

2. The gas turbine engine of claim 1, wherein the annular retention strap is a full, integral hoop.

3. The gas turbine engine of claim 1, wherein the annular retention strap is completely surrounded by the weight-saving filler.

4. The gas turbine engine of claim 1, wherein:
the annular structure comprises a first coefficient of thermal expansion;
the annular retention strap comprises a second coefficient of thermal expansion;
the first coefficient of thermal expansion is substantially equal to the second coefficient of thermal expansion.

5. The gas turbine engine of claim 4, wherein the annular structure and the annular retention strap are made from a same material.

6. The gas turbine engine of claim 1, wherein the annular retention strap comprises a woven composite material.

7. The gas turbine engine of claim 1, wherein the weight-saving filler is a rubber material.

8. The gas turbine engine of claim 1, wherein a radially outward surface of the weight-saving filler is configured to be exposed to airflow.

9. The gas turbine engine of claim 8, wherein the annular structure is a flow splitter between flowpath streams.

10. The gas turbine engine of claim 9, wherein the annular structure is a stator shroud.

11. The gas turbine engine of claim 9, wherein the annular structure is a case.

12. A gas turbine engine comprising:
an annular structure disposed around an engine central longitudinal axis of the gas turbine engine, wherein the annular structure is a flow splitter between a core flowpath and a bypass flowpath, wherein the annular structure defines an annular channel and comprises a first density;
a weight-saving filler disposed within the annular channel, wherein the weight-saving filler comprises a second density that is less than the first density; and
an annular retention strap disposed around the engine central longitudinal axis of the gas turbine engine, wherein the annular retention strap is completely surrounded by the weight-saving filler;
wherein the annular channel faces radially outward, wherein a radially outward surface of the weight-saving filler is configured to be exposed to airflow in the bypass flowpath.

13. A method of assembling a gas turbine engine, the method comprising:
positioning an annular retention strap in an annular channel defined by an annular structure, wherein the annular retention strap and the annular channel are disposed about an engine central longitudinal axis of the gas turbine engine; and
after positioning the annular retention strap in the annular channel, positioning a weight-saving filler into the annular channel to substantially fill the annular channel around the annular retention strap such that the annular retention strap is at least partially embedded in the weight-saving filler.

14. The method of claim 13, further comprising positioning a plurality of weight-saving spacers in the annular channel before the positioning the annular retention strap in the annular channel, wherein the preformed weight-saving spacers facilitate holding the annular retention strap in a desired orientation during the positioning the weight-saving filler into the annular channel.

15. The method of claim 14, wherein the plurality of weight-saving spacers are circumferentially distributed around the engine central longitudinal axis.

16. The method of claim 14, wherein the plurality of weight-saving spacers and the weight-saving filler are made from the same material.

17. The method of claim 13, wherein the positioning the weight-saving filler comprises pouring a liquid precursor into the annular channel and allowing the liquid precursor to cure to become the weight-saving filler.

18. The method of claim 17, further comprising forming a radially outward surface of the weight-saving filler using a mold, wherein the radially outward surface of the weight-saving filler is configured to be exposed to airflow.

19. The method of claim 13, wherein the positioning the annular retention strap in the annular channel defined by the annular structure comprises cooling the annular structure to contract the annular structure to a first diameter and heating the annular retention strap to expand the annular retention strap to a second diameter, wherein the first diameter is smaller than the second diameter.

20. The method of claim 19, wherein after allowing the annular structure and the annular retention strap to reach a substantially similar temperature, the annular structure comprises a third diameter and the annular retention strap comprises a fourth diameter, wherein the third diameter is larger than the fourth diameter.

* * * * *